Sept. 14, 1965

H. G. AHLICH ETAL 3,205,533

SCRAP RECLAIMING APPARATUS

Filed Dec. 14, 1961

INVENTORS.
Harold G. Ahlich
Robert R. Rady
Glenn M. Pinson

BY

AGENT

Sept. 14, 1965  H. G. AHLICH ETAL  3,205,533
SCRAP RECLAIMING APPARATUS
Filed Dec. 14, 1961  2 Sheets-Sheet 2

INVENTORS.
Harold G. Ahlich
Robert R. Rady
Glenn M. Pinson
BY
AGENT

United States Patent Office 3,205,533
Patented Sept. 14, 1965

3,205,533
SCRAP RECLAIMING APPARATUS
Harold G. Ahlich, Fairview, Robert R. Rady, Cleveland, and Glenn M. Pinson, Parma, Ohio, assignors to The Dow Chemical Company, Midland, Mich., a corporation of Delaware
Filed Dec. 14, 1961, Ser. No. 160,416
4 Claims. (Cl. 18—12)

This invention relates to an apparatus for reclaiming plastic scrap. It more specifically relates to an apparatus for converting scrap plastic material which frequently has a high surface area per weight unit to a molten form having a much smaller surface area.

Frequently, in the manufacture of thermoplastic resinous articles such as films, fibers, filaments, foam, and the like, considerable quantities of scrap material are generated which, in many cases, must be discarded without deriving any significant benefit therefrom. For example, in the extrusion of plastic film such as polystyrene, frequently there are quantities of film produced, prior to obtaining the desired operating conditions and when mechanical difficulties are encountered, which are unacceptable by commercial standards or are not suitable for sale use. Usually these unacceptable products have a low bulk density. Oftentimes film materials are in the form of a relatively small roll tightly overwrapping a fiber or metal core and for reuse must be removed from the core. This is done by forming a longitudinal cut in the roll parallel to its axis of generation. The plastic material is retrieved as a number of sheets having a generally cylindrical curvature. Scrap of this nature has a high surface area and exists in a relatively large and bulky form which frequently must be ground or further divided prior to feeding to conventional reclamation apparatus. Oftentimes large quantities of film or sheet are obtained which are not wound on a core, but extruded in flat or tubular form and bundled or crumpled together by hand and placed in drums or boxes. Scrap of this nature has a very low bulk density, and if it is to be reclaimed, generally it must be handled piece by piece and fed into a cutter prior to a screw extruder or similar device. The excessive handling required for such film scrap frequently makes reclaiming thereof economically undesirable and the scrap material becomes waste and a liability. Many ground films similarly have a relatively high surface area which tends to present difficulties both mechanically and economically including a marked tendency to bridge badly when fed from certain hoppers. A broadly similar situation exists where synthetic thermoplastic resinous foams are produced or fabricated. Often large volumes of low density scrap are generated which require extensive mechanical working prior to feeding the material to an extruder or other melting device capable of preparing a relatively high density product. Like problems are encountered with thermoplastic filament and fiber scrap which oftentimes during startup operations is not spooled, but is gathered as a series of random loops having high volume and low bulk density.

It is an object of this invention to provide an improved apparatus for the recovery of synthetic resinous themoplastic scrap.

It is a further object of this invention to provide an apparatus which is capable of handling large quantities of low bulk density thermoplastic scrap.

It is a further object of this invention to provide an apparatus which will convert low bulk density high surface area synthetic thermoplastic resinous scrap into molten polymer in an economical manner.

These benefits and other advantages are readily attained by means of a synthetic thermoplastic resinous scrap reclaiming apparatus in accordance with the invention which comprises: a frame, said frame supporting an elongated conduit having a pasage having a first end and a second end, said first end of said passage having a substantially larger cross sectional configuration than said second end of said passage, a heat exchange zone disposed adjacent said second end of said passage, said zone comprising a plurality of heating elements having heat exchange surfaces generally parallel to the longitudinal axis of said passageway, said surfaces being spaced apart to provide communication between said first end and said second end, a ram disposed within said passage adjacent its first end, said ram reciprocally mounted on said frame and adapted to be moved generally axially within said passage, said ram having a cross sectional dimension generally corresponding to the internal cross sectional dimension of said passageway toward said first end adjacent said heat exchange zone and the second end of said vertically extending passage being in communication with a molten polymer receiving means.

Further features and advantages of the invention will become more apparent when taken in view of the following specification and drawing wherein.

Figure 2:
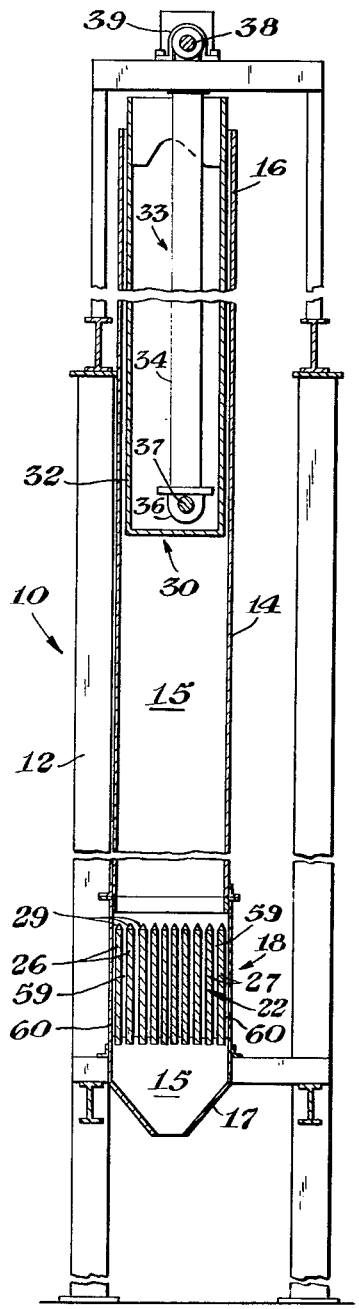
FIGURE 2 is a sectional view of the apparatus of FIGURE 1 along the line 2—2.
Figure 1:
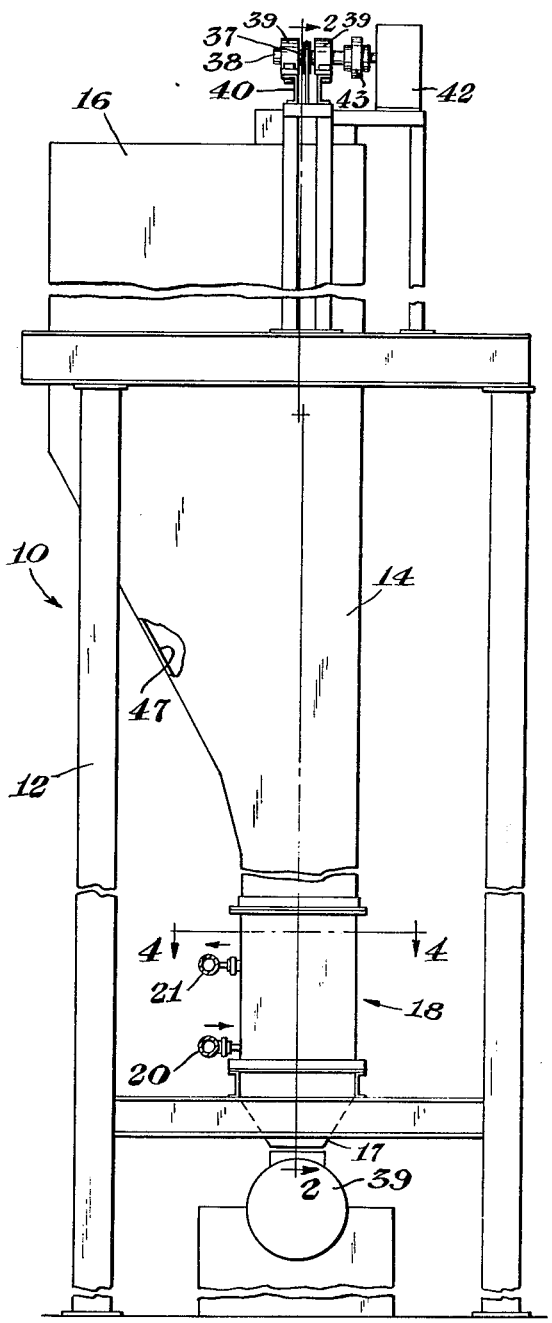
FIGURE 1 is a schematic side representation of a scrap reclaiming apparatus in accordance with the invention.

With reference to the drawings, particularly FIGURES 1 and 2, there is schematically depicted a side view of a scrap reclaiming apparatus generally designated by the reference numeral 10. The apparatus 10 comprises a frame 12 supporting a generally vertically disposed conduit 14 defining a passage 15 having an upper end 16 and a lower end 17. A heat exchange zone 18 is disposed within the passageway 15. Toward the lower end 17 of the conduit 14 is disposed a heat exchange fluid inlet 20 and a heat exchange fluid outlet 21 which are in full communication with a bank of heaters generally indicated by the reference numeral 22. The heaters 22 are disposed within the heat exchange zone 18. The heat exchange bank 22 is comprised of a number of individual heat exchange sections 26, each heat exchange section 26 comprises a body section 27 and a knife or leading edge section 29. Positioned within the conduit 14 is a ram generally indicated by the reference numeral 30. The ram 30 is adapted to be slidably or reciprocally positioned at will adjacent the upper end 16 of the conduit 14 and to extend into the conduit 14 and approach the heating exchange zone 18. The ram 30 comprises a shell 32 having disposed therein elevating means 33. The elevating means 33 comprises a pair of telescoping tubular members, only the outer one, 34, being shown. Member 34 is pivotally attached to the interior of the shell 32 by a bearing 36 and a shaft 37. A cable 40 is disposed within the telescopic tubular assembly 33, and passes over the pulley 37 affixed to shaft 38. The shaft 38 is rotatably supported by the bearings 39. The shaft 38 is driven by the gear reducer 42 through a coupling 43. The upper end 16 of the conduit 14 has a significantly greater cross sectional area than does the lower portion of the conduit in the region of the heat exchange zone 18. The bearings 38 and gear reducer 42 are rigidly affixed to the frame 12. In FIGURE 1 the discharge end 17 of the conduit 14 is shown in communication with a polymer forwarding means 39 which, for the sake of clarity, is omitted in FIGURE 2.

Figure 3:
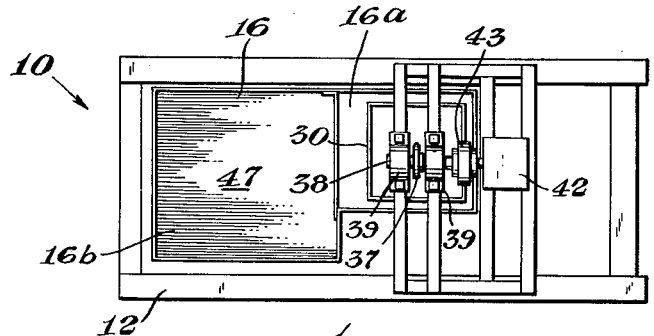
FIGURE 3 is a top view of the assembly of FIGURE 1.

In FIGURE 3 there is illustrated a top view of the apparatus 10 shown in the FIGURE 1. The upper end 16 of the conduit 14 comprises two zones 16a and 16b. 16a is roughly coextensive with the portion of the conduit occupied by the ram 30, whereas an enlarged open portion 16b is provided adjacent ram 30. The surface of the conduit 14 designated as 47 represents the tapering portion of the conduit 14 leading into the lower heat exchange section 24.

Figure 4:
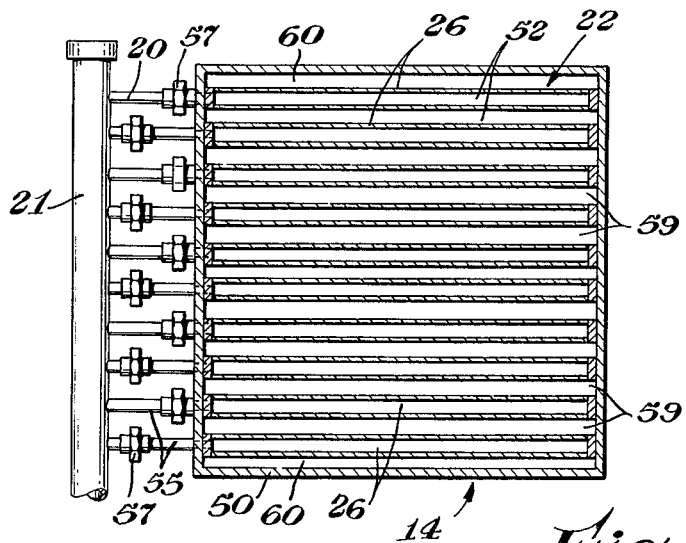
FIGURE 4 is a sectional view of a heating element through 4—4.

FIGURE 4 is a cross sectional view of the conduit 14 along the section 4—4. The walls 50 of the conduit 14 enclose the heat exchange bank 22 comprised of heat exchange sections 26 having a cavity 52 within. The cavities 52 are in communication with heat exchange fluid inlet 20 and the heat exchange fluid outlet 21. A plurality of conduits 55 provide communication between the inlets 20 and outlets 21 and the heat exchange sections 26. The couplings 57 provide means of disconnecting the headers from the heat exchange sections 26 and facilitate cleaning. Between each of the heat exchange sections 26 is disposed a passageway 59. Between the wall 50 and the nearest heat exchange section 26 is a passageway 60. The passageways 59 and 60 provide communication between upper end 16 and lower end 17.

Figure 5:
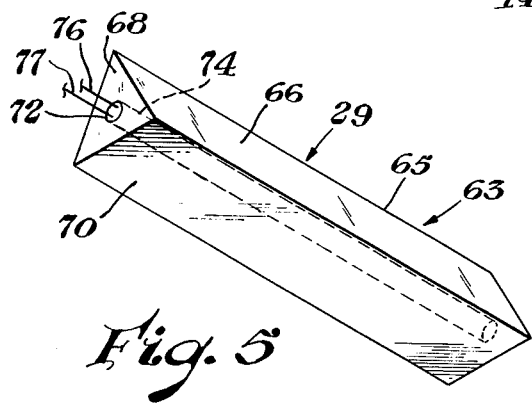
FIGURE 5 is an isometric representation of the heating element employed in the apparatus of FIGURE 1.

In FIGURE 5 there is illustrated an isometric view of a knife generally indicated by the reference numeral 29. The knife 29 comprises a triangular prismatic body 63 having a leading edge 65, a pair of like surfaces 66 (one shown) and an end face 68 and a base surface 70. A cavity 72 extends lengthwise within the body 65 and terminates on face 68. The cavity 72 contains a cartridge heater 74 having electrical supply leads 76 and 77.

Operation of the apparatus in accordance with the invention is most clearly understood by reference to FIGURES 1, 2 and 3. Electrical power is initially provided to the knives 29 mounted on the heaters 26. A liquid of sufficient temperature to melt the plastic which is to be reclaimed is passed through the heat exchange section 18, that is, in header 20 and out header 21. Scrap such as film scrap, filament entanglements, and other forms of plastic to be reclaimed are placed in the conduit portion 16b, which is adjacent to the ram 30 when it is in the raised position. The scrap tumbles down and is deflected by a surface 47 to a location beneath the ram 30. If an excess quantity of scrap is added, the portion of the conduit 16b will be filled. The ram is lowered providing a downwardly acting force on the scrap occupying the space between the lower end of the ram and the upper end of the heating section 22. Scrap contacting the heaters 26 is raised to a temperature sufficiently high to permit viscous flow. The force exerted by the ram continually feeds scrap to the heating section where it is melted or fused into a relatively homogeneous mass. The gases normally present in low bulk density material such as air pass up and around the ram and out of the hopper. When the ram travels downwardly toward the heating section as far as is possible, the ram is quickly raised, permitting more scrap material to occupy the space in conduit 15 between the lower portion of the ram and the heating section 18. Thus, a continual supply of polymeric material is forced from the terminal portion of the lower end 17 of the conduit 14. In FIGURE 1, a molten polymer forwarding and extrusion apparatus 39 is represented positioned to receive the extrude from the scrap reclaiming apparatus.

In sharp contrast to known scrap reclaiming equipment, the apparatus of the invention permits low bulk density scrap such as that resulting from filament forming operations to be processed into a usable form with a minimum of manual labor and a minimum number of steps. The present invention does not require that the scrap be precompacted or baled, but simply should consist only of polymeric thermoplastic resinous material without relatively large non-thermoplastic bodies such as paper cores, metal, and the like being included.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. An apparatus for reclaiming thermoplastic scrap material comprising a frame, said frame supporting a generally elongated conduit in a generally vertical position, said conduit having a passage, said passage having a first end and a second end, said first end of said passage having a substantially larger cross sectional configuration than said second end of said passage and said first end being disposed above said second end, a heat exchange zone disposed adjacent said second end of said passage, said zone comprising a plurality of heating elements having generally flat heat exchange surfaces generally parallel to the longitudinal axis of said passage, said surfaces being spaced apart to provide communication between said first end and said second end, a ram disposed within said passage adjacent its first end, said ram reciprocally mounted on said frame and adapted to be moved generally axially within said passage, said ram having a cross sectional configuration generally corresponding to the internal cross sectional configuration of said passage immediately adjacent said heat exchange zone and toward said ram and the second end of said vertically extending passage being in communication with a molten polymer receiving means.

2. The apparatus of claim 1, including a molten polymer forwarding apparatus in communication with said second end of said conduit.

3. The apparatus of claim 2, including an extruder in operative combination with said polymer forwarding apparatus.

4. The apparatus of claim 1, wherein said heating exchange elements comprise a rectangular hollow plate-like member in communication with means to circulate a heat exchange fluid within, said generally rectangular members being provided with a tapering edge adjacent said ram and in said tapering edge members being provided with internal heating means.

References Cited by the Examiner

UNITED STATES PATENTS

| | | | |
|---|---|---|---|
| 1,279,220 | 9/18 | Banbury | 18—2 |
| 2,215,435 | 9/40 | Hale | 18—12 |
| 2,227,845 | 1/41 | Rogers | 126—343.5 |
| 2,373,939 | 4/45 | Bailey | 18—12 |
| 2,548,177 | 4/51 | Tauber | 126—343.5 |
| 2,898,628 | 8/59 | Phipps | 18—8 |
| 2,916,262 | 12/59 | Flores | 18—8 XR |
| 2,923,967 | 2/60 | Smith | 18—2 |

FOREIGN PATENTS

| | | |
|---|---|---|
| 1,158,980 | 2/58 | France. |
| 881,013 | 6/53 | Germany. |

WILLIAM J. STEPHENSON, *Primary Examiner.*